INVENTORS:
ROBERT MAYER
ELBERT N. SHAWHAN
EINAR T. YOUNG
BY Donald R. Johnson
ATTY.

3,473,380
LIQUID LEVEL MEASURING APPARATUS
Robert Mayer, Ardmore, Elbert N. Shawhan, West
Chester, and Einar T. Young, Newtown Square,
Pa., assignors to Sun Oil Company, Philadelphia,
Pa., a corporation of New Jersey
Filed Dec. 28, 1967, Ser. No. 694,226
Int. Cl. G01f 23/28
U.S. Cl. 73—304                5 Claims

ABSTRACT OF THE DISCLOSURE

For determining the level of a body of liquid whose upper surface may move through an extended range, a liquid-level-responsive probe (e.g., a capacitive probe), whose length is small compared to this range, is suspended vertically in the liquid. The signal output obtained from the probe is measured. When this output reaches a value corresponding to a liquid level spaced a predetermined distance above (or below) the center of the probe, the probe is automatically raised (or lowered) precisely this same distance, to return the liquid level substantially to the center of the probe. An indicator, mechanically coupled to the driving means for the probe, indicates the footage location of the probe relative to the bottom of the body.

---

This invention relates to apparatus for determining the level of the upper surface of a body of liquid. The apparatus of this invention has particular utility for the measurement of liquid level in subterranean caverns for hydrocarbon storgage, and the apparatus will be described herein in connection with the measurement of liquid level in such caverns. However, it is pointed out that the present apparatus is also useful for the determination of liquid level in various other types of storage receptacles, such as above-ground storage tanks.

It has been found that liquid levels in a storage cavern may be conveniently, effectively, and accurately measured by the use of a capacitive probe assembly wherein the liquid stored in the cavern serves as the dielectric between two spaced capacitive electrodes. Such a scheme involves two elongated spaced electrodes which are suspended in the cavern liquid, with the level of the liquid between the electrodes rising and falling as the liquid level in the cavern rises and falls.

A typical subterranean storage cavern may have an operative or storage depth (throughout which the liquid level is to be measured) on the order of forty feet, or even more. To utilize, for liquid level measurement, a capacitive probe of this length would be quite impractical, from the standpoint of accuracy in measurement. For example, a measurement error of 10% would amount to only 2.4 inches with a probe two feet in length, but it would amount to four feet with a probe forty feet long. Therefore, a capacitive probe, whose length is small compared to the total range of liquid level variation in the cavern, is used, and this probe is automatically moved up and down to follow the liquid level in the cavern. According to this invention, the probe is moved incrementally or in steps (as necessitated by the movement of liquid level in the cavern), thus reducing the amount of wear and tear on the apparatus as contrasted to a system involving a continuous follow-up of the cavern liquid level by the probe.

An object of this invention is to provide a novel apparatus for gauging or determining the liquid level in subterranean storage caverns.

Another object is to provide, for a liquid-level-responsive probe, a follow-up arrangement which moves the probe in an incremental fashion to follow changes in the liquid level being measured.

A further object is to provide a novel arrangement for driving a liquid-level-responsive probe in such fashion that the latter automatically follows changes in the liquid level being measured.

The objects of this invention are accomplished, briefly, in the following manner: A capacitive probe assembly, the capacitance of which is responsive to changes in liquid level, is suspended in a cavern (wherein the liquid level is to be measured) by means of a cable which provides both a mechanical and an electrical connection to the probe. This cable is wound on a reel at the surface; the reel is arranged for rotation by a drive motor. At the surface, the cable is electrically connected to a suitable capacitance-measuring circuit whose output drives one pen of a recorder. When this recorder pen reaches one end or the other of an established measuring range, a circuit is closed to the reel drive motor in the appropriate sense; the motor then operates (under the control of cam-operated switches) to drive the probe up or down exactly one foot, thereby to center the length of the probe at the liquid level then existing in the cavern. This provides a follow-up system for the probe assembly, whereby the probe follows the liquid level in the cavern, in incremental steps of one foot each. A mechanical counter on the motor shaft indicates the footage location of the probe with respect to a "zero" point, which is the bottom of the cavern.

A detailed description of the invention follows, taken in conjunction with the accompanying drawings, wherein.

The measuring apparatus of this invention is particularly useful for the measurement of liquid level in subterranean storage caverns and such apparatus will be described in connection therewith; however, it is pointed out that it is useful in other environments (e.g., in storage tanks) wherein the liquid level to be measured may move through an extended range.

Figures 1, 2, 3:
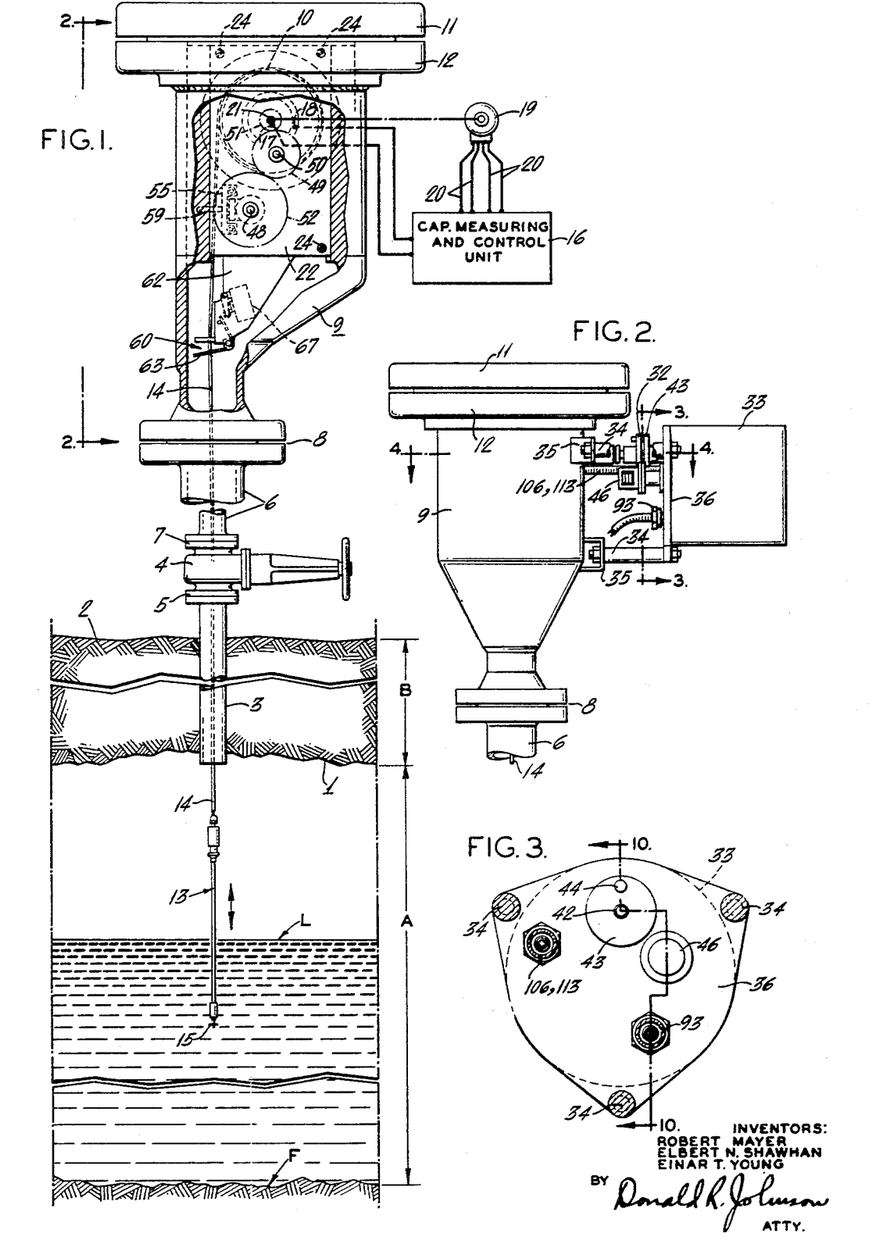
FIG. 1 is a combined diagrammatic and structural representation of the apparatus of this invention as installed in a subterranean storage cavern, the upper portion of this figure being drawn on an enlarged scale.
FIG. 2 is a front elevation of the apparatus, looking in the direction 2—2 of FIG. 1.
FIG. 3 is a sectional view taken along line 3—3 of FIG. 2.

Referring first to FIG. 1, a subterranean cavern 1 may have an effective storage depth A of some thirty or forty feet, while the distance B from the surface 2 to the top of the cavern may be on the order of 300 feet, or even more. The lower end of a string of casing 3 is sealed into the top of the cavern 1, this casing string extending above the ground surface 2. Above surface 2, one side of a manually-operated gate valve 4 is secured by means of a flanged coupling 5 to the upper end of casing string 3, and an additional piece of pipe 6 is secured at its lower end, by means of a flanged coupling 7, to the other side of valve 4. The upper end of pipe 6 is secured by means of a flanged coupling 8 to the lower end of a housing 9 in which is rotatably mounted a reel 10. The upper end of housing 9 is closed by means of a cover 11 which is bolted to a flange 12 welded to the upper end of the housing. During normal operation of the apparatus, gate 4 is open, so that the interior of housing 9 is open to the pressure of the cavern 1. Therefore, the cover 11 must provide a pressure-tight seal for housing 9.

A capacitive-type probe assembly 13 is fastened to the lower end of a cable 14 which passes upwardly through items 3, 4, and 6 into housing 9 and which is wound on reel 10. Assembly 13 is mechanically supported in cavern 1 by means of cable 14, so that the probe can sense the liquid level L in the cavern. A probe assembly which can be used at 13 is disclosed in detail in the copending Lerner application, Ser. No. 676,848, filed Oct. 20, 1967. The Lerner probe assembly includes a bottom-sensing element which is schematically illustrated at 15 and which is located at the bottom of the probe assembly 13; this bottom-sensing element produces a noticeable change in the capacitance of the assembly when such element comes into engagement with a solid body such as the floor F of the cavern 1 (this assumes that the probe assembly 13 is being lowered down or unreeled through the liquid in the cavern, toward the bottom thereof).

For maintenance purposes, the probe assembly 13 may be reeled in or raised through the valve 4 to a location above valve 4 (and, of course, above the ground level 2), following which this valve may be closed (to maintain the cavern pressure) and pipe 6 may be unflanged at 8 to obtain access to the probe, for maintenance thereof.

The cable 14, in addition to its mechanical supporting or suspending function, serves to convey electrical signals (which are indicative of capacitance, and which represent the liquid level L or cavern bottom F) between the probe assembly 13 and a capacitance measuring and control unit 16 (remote readout chassis) which is located outside the housing 9. The electrical connections between cable 14 and unit 16 are made by means of a pair of contacts 17 and 18 which ride on rotary reel 10, contact 17 contacting the reel axle and providing a "ground" connection from the cable to unit 16 and contact 18 contacting a slip ring on reel 10, to which slip ring one of the cable conductors is connected.

Reel 10 is driven (rotated) by a reversible reel drive motor 19 which is actually located outside of housing 9, as will become apparent hereinafter. Motor 19 is controlled by unit 16 (in turn responsive to the capacitance provided by probe assembly 13) to cause the motor to produce an automatic follow-up action for probe assembly 13, the control connections from unit 16 to motor 19 being indicated schematically at 20. The automatic follow-up action, in general, results from the driving of reel 10 by motor 19, to cause probe assembly 13 to be moved either up or down in cavern 1 so as to follow the movement of the liquid level L therein. This automatic follow-up action will be described hereinafter in more detail; for the present, it will suffice merely to say that when the liquid level L is more than one foot from the center of the measuring length of the probe assembly 13 (resulting in a probe capacitance differing more than a predetermined amount from a mean value of probe capacitance), the control unit 16 acts to cause the drive motor 19 to raise or lower the probe assembly (by means of the reel 10, reeling in or paying out the cable 14) an incremental distance of one foot, thereby to substantially recenter the measuring length of the probe at the liquid level L.

The automatic follow-up action just described (which takes place during the "normal" measurement of liquid level in the cavern), plus the lowering of the probe assembly 13 to the cavern floor F for bottom-sensing or "zero-izing," plus the raising of the probe assembly to a location above valve 4 for maintenance of the probe assembly or of the reel assembly, are all accomplished by suitably controlling the drive motor 19.

Figure 4:
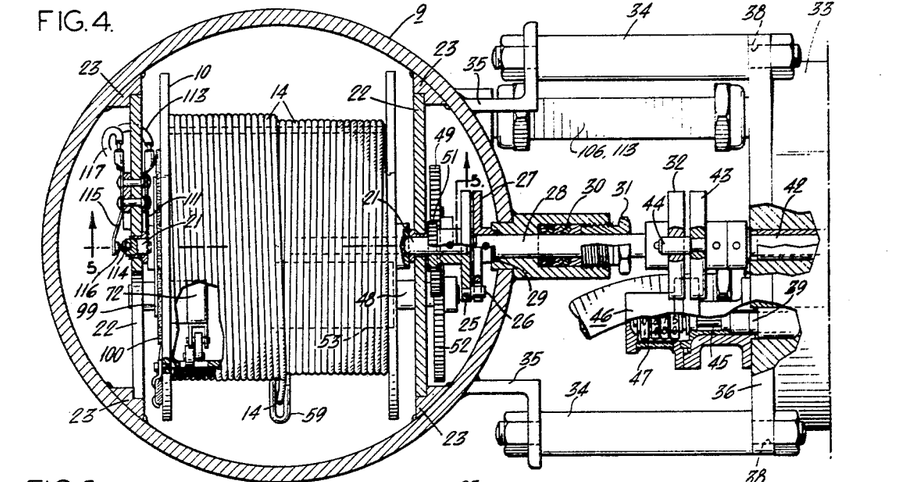
FIG. 4 is a horizontal section through a portion of the mechanism, taken along line 4—4 of FIG. 2.

Refer now also to FIGS. 2–4. The reel housing 9, as previously described, is coupled at its lower end to pipe 6; for this, the lower end of this housing has the same cross-section as pipe 6. The upper end of reel housing 9 has an enlarged cylindrical cross-section, as illustrated in FIGS. 1 and 2. By way of example, this enlarged upper end of housing 9 may be about ten inches in diameter, pipe 6 having a diameter of three inches. Reel or drum 10 is located at the upper end of reel housing 9, and is pinned to a horizontally-extending shaft 21 whose opposite ends are journaled for rotation in a pair of spaced, parallel vertically-extending mounting plates 22 which are slid downwardly into fixed side abutments 23 provided in housing 9, against stops 165 (see FIG. 5), and are maintained rigidly in position by bracing rods 24 (three in number, for example) which extend between the plates.

Shaft 21, and the reel (cable drum) carried thereby, are rotatably driven through a disc 25 (FIG. 4) which is pined to one end of shaft 21 and which carries near its outer periphery an outwardly-extending pin 26. Pin 26 is adapted to drivingly fit into a slot in a disc 27 which is pinned to the inner end of a rotatable stub shaft 28, inside housing 9. Stub shaft 28 is pressure-sealed through the wall of housing 9 by means of an O-ring 29 which surrounds this shaft, together with shaft packing 30 (the latter being located outside of housing 9) which is urged into proper sealing relation with shaft 28 by means of a threaded gland 31. In this manner, the stub shaft 28 is rotatably sealed through the wall of housing 9, and rotation of this stub shaft causes rotation of the cable reel or drum 10 (inside of housing 9) by way of items 27, 26, 25, and 21. A disc 32, having a slot therein, is pinned to the outer end of stub shaft 28.

As previously mentioned, the reel housing 9 is in direct communication with the cavern 1, by way of casing 3, valve 4, and pipe 6, so that the interior of this housing is subject to the cavern pressure, which is usually super-atmospheric.

A separate drive motor housing 33, the interior of which is at atmospheric pressure, is mounted adjacent reel housing 9 by means of three rods 34, which are threaded at both ends, one end of each rod being fastened by means of a nut to a respective angle bracket 35 welded to the outside of reel housing 9 and the other end of each rod being secured in a respective hole 38 provided in the base 36 of drive motor housing 33. Housing 33 has a disc base 36, a cylindrical side wall threadedly secured thereto, and a disc cover 37 (FIG. 10) welded to the side wall.

The reel drive motor 19 is suitably mounted inside housing 33, this motor having an output shaft 85 (see FIGS. 11 and 10) to which a drive gear 86 is pinned. A mounting plate 78 is held in fixed, parallel relation to the housing base 36 by spacer rods 79 (three in number, for example) which extend between base 36 and plate 78 and are secured at their respective ends to the base and the plate. Drive gear 86 drives a large gear 87 which is journaled for rotation on a pin 88 secured in plate 78 and extending outwardly therefrom. A small gear 84 is pined to gear 87 so as to rotate therewith; gear 84 is also journaled for rotation on pin 88.

Gear 84 drives a larger gear 73 which is adjustably mounted on an indexing drive shaft 39, the gear ratio between gears 84 and 73 being 1:4, so that gear 73 rotates ¼ as fast as gears 87 and 84. Gear 73 is mounted on shaft 39 in such a way that it is secured directly to such shaft and drives such shaft, yet is capable of manual angular adjustment with respect to the shaft from time to time, when desired. This adjustable arrangement will be described hereinafter. One end of indexing shaft 39 extends through housing base 36 and is journaled therein, while the opposite end of this shaft (which carries the gear 73) is journaled in and extends through the mounting plate 78.

Near the housing base end of shaft 39, a forty-tooth gear 40 is pinned to this shaft. Drive gear 40 meshes with a sixty-tooth gear 41 pinned to the inner end of a short driver shaft 42 which extends through the housing base 36 and is journaled for rotation therein. Gears 40 and 41 are both located inside housing 33. A drive disc 43, which carries near its outer periphery an outwardly-extending drive pin 44, is pinned to the outer end of shaft 42. Drive pin 44 is adapted to drivingly fit into the slot in disc 32 (FIG. 4); thus, the indexing drive shaft 39 rotates stub shaft 28 by way of items 40, 41, 42, 43, 44, and 32. The drive from shaft 42 to shafts 28 and 21 is "direct," so that shafts 42 and 21 rotate at the same rate.

During "automatic" or follow-up operation of the probe assembly 13, indexing shaft 39 is caused to rotate through precisely one complete revolution at a time, in one direction or the other (as will be described in detail hereinafter). With the gear ratio set forth for gears 40 and 41, this causes driver shaft 42 to rotate two-thirds of a revolution, resulting in a rotation of reel shaft 21 and reel or drum 10 through two-thirds of a turn. The diameter of reel 10 is such that two-thirds of a turn thereof moves a one-foot length of cable 14 onto or off the reel.

To the end of indexing shaft 39 which extends through housing base 36, the drive shaft 45 of a "local" footage indicator 46 is pinned. Footage indicator 46 is mounted on the outer face of base 36, and preferably comprises a four-wheeled mechanical revolution counter each of whose wheels carries the numerals "0" through "9," the four wheels being coupled together in decade relationship. The footage indicator 46 is provided with a window 47 through which the units, tens, and hundreds wheels of the counter are visible, the tenths wheel being masked off. Each revolution of shaft 39 moves the probe assembly 13 up or down one foot, and since each shaft revolution turns the counter one "unit," it should be apparent that the number displayed on counter 46 indicates the footage location of the probe assembly above a "zero" point, which is made to coincide with the cavern floor F. The counter or footage indicator 46 is provided with a conventional manual adjustment means, by operation of which the counter wheels may be manually set to a desired reading.

Figure 5:
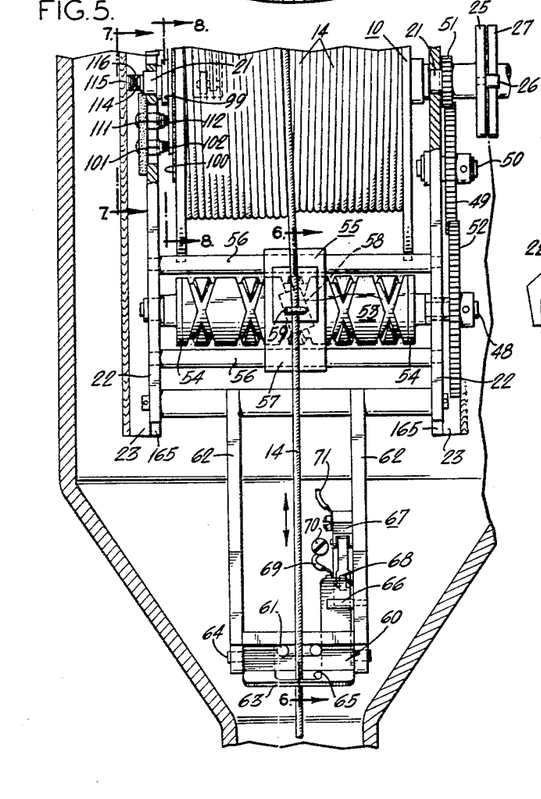
FIG. 5 is a vertical section taken along line 5—5 of FIG. 4.
Figure 6:
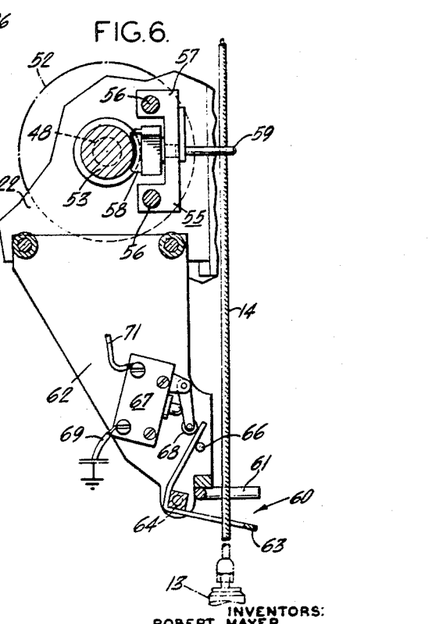
FIG. 6 is a partial sectional view taken on line 6—6 of FIG. 5, illustrating certain details of construction.

Refer now to FIGS. 5 and 6. A shaft 48 has its opposite ends journaled for rotation in the mounting plates 22; the axis of shaft 48 is parallel to the axis of reel shaft 21 and the vertical plane which contains the axis of shaft 48 is displaced in a direction toward the longitudinal axis of pipe 6) from the vertical plane which contains the axis of shaft 21. Speaking generally, the shaft 48 is located nearer the bottom of housing 9 than is shaft 21. Shaft 48 is rotatably driven from shaft 21, in the same direction but at a slower rate, by means of a gear-down arrangement which includes an idler gear 49 fixed to a stub shaft 50 (which is journaled for rotation in one of the mounting plates 22) and meshing with a driven gear 51 pinned to shaft 21, and a large driven gear 52 pinned to shaft 48 and also meshing with gear 49.

A cylindrical cable-laying or cable-distributing member 53, which cooperates with the cable reel or drum 10, is pinned to shaft 48. Member 53 has two helical channels of the same pitch cut into its periphery, one having a right-hand sense and the other a left-hand sense. In this way, a double helix is provided which extends from end to end of member 53, the helical channels being closed off at the two ends of this member by means of the respective disc-like end plates 54 whose diameters are equal to the O.D. of member 53 and which are suitably secured to the body of this member.

A cable-feeding member 55 (which cooperates with member 53 and is located at one side thereof) is mounted for reciprocatory or sliding motion on a pair of parallel fixed cylindrical bars 56 which extend parallel to shaft 48 and whose opposite ends are secured respectively to the mounting plates 22. Member 55 includes a U-shaped bracket 57 provided with holes in its respective arms through which slidably pass the bars 56 (see FIG. 6). Attached to bracket 57 is a shoe 58 which is positioned between the arms of this bracket; at its outer end, shoe 58 is of arcuate configuration and this end of the shoe rides in the double helical channel of member 53 to cause member 55 to reciprocate back and forth (in a direction parallel to the axis of shaft 48) as member 53 rotates. Assuming that member 55 is initially located at some intermediate point along the length of member 53, it should be obvious that the initial movement of member 55 will be in one direction or the other, depending upon the direction of rotation of shaft 48 and member 53.

The actual cable-guiding portion of member 55 comprises a U-shaped loop element 59 which is secured to shoe 58 and to bracket 57. The face plane of loop 59 is parallel to the axis of reel shaft 21, and this loop is located in the path of cable 14, from pipe 6 into housing 9 and onto reel 10 (see FIG. 5). Cable 14 can thus pass through the space between the two arms of loop 59, as illustrated in FIG. 4. Thus, the reciprocating member 55 (driven back and forth by the double helical channel of member 53, as this latter member rotates) causes the cable 14 to be laid down on (or fed off from) reel 10 in successive layers, the individual turns being laid side by side to constitute a single layer. In this connection, it is pointed out that (assuming shaft 48 and member 53 to be rotating continuously in a certain direction) when feeding member 55 reaches one end of member 53, following say the right-hand helix, shoe 58 is constrained by the adjacent end plate 54 to enter the left-hand helix, and feeding member 55 will then travel toward the opposite end plate 54 (at the other end of member 53).

Between pipe 6 and the cable-guiding loop element 59, cable 14 passes through an "up" limit switch arrangement denoted generally by numeral 60. The arrangement 60 includes a fixed upstanding U-shaped member 61 the base of which is welded to a cross piece which is in turn secured between the outer ends of two spaced, parallel wing plates 62; the inner or upper ends of the wing plates 62 are fixedly secured in a suitable manner to (and between) mounting plates 22, at the lower ends of these latter plates. The arrangement 60 also includes a switch-actuating member 63 which is pivotally mounted on wing plates 62, being fastened to a shaft 64 journaled for rotation at its opposite ends in plates 62. Seen edgewise as in FIG. 6, member 63 has a shape resembling that of the letter L, with one leg of the L approximately horizontal and the other leg thereof approximately vertical. Looking at the face or front of member 63, the leg of the L that is approximately horizontal has the shape of an inverted U, the two ends of this U being fastened to shaft 64.

The leg of the L that is approximately horizontal is slightly below member 61, is approximately parallel thereto, and is laterally aligned therewith. Therefore, the two U's of members 63 and 61, which are disposed in inverted relation with respect to each other, form in combination a closed loop 65 of restricted area through which the cable 14 can pass, but this loop is not of sufficient area to allow passage therethrough of the upper end of probe assembly 13. The cable 14 passes through loop 65 on its way to loop 59 and reel 10. Thus, when cable 14 (to the bottom end of which is attached the probe assembly 13, as previously described) is being reeled up from the cavern for the maintenance of the probe assembly, the upper end of the probe assembly will eventually come into engagement with member 63, causing it to pivot in the counterclockwise direction as viewed in FIG. 6. A pin 66, fixed to one of the wing plates 62 and lying in the path of rotation of the approximately vertical leg of the L of member 63, provides a stop which limits the pivotal movement of member 63 in the clockwise direction (viewed in FIG. 6).

A single-pole, single-throw snap-action momentary-contact switch 67, serving as an "up" limit switch, is mounted on one of the wing plates 62 in such a position that the roller 68 at the free end of its pivoted actuating arm lies in the path of rotation of the approximately vertical leg of the L of member 63 (when this member rotates in the counterclockwise direction, viewed as in FIG. 6). Switch 67 is normally closed, but is actuated to its open position when member 63 pivots in the counterclockwise direction. Thus, switch 67 is actuated to the open position when the upper end of the probe assembly 13 comes into engagement with member 63 (as the probe asembly is being raised above valve 4 so that the latter may be closed before carrying out any of several maintenance operations), and this switch actuation serves to deenergize the reel drive motor 19, as will be explained subsequently in more detail; in this way, an "up" limiting action is provided. Two electrical leads are connected to switch 67; one lead 69 is connected to a "ground" lug 70 which is metallically connected to housing 9, inside the same, and the other lead 71 is taken out of the housing 9, as one of the conductors of a cable which is led out of this housing through a pressure seal (not shown), and into the housing 33 through another pressure seal; from housing 33, this lead extends through the pressure seal 93 to unit 16, which is a remote readout chassis.

A single-pole, single-throw snap-action momentary-contact switch 72, serving as a "down" limit switch, is mounted on the underside of the hub of reel 10 in such a position that the roller at the free end of its pivoted actuating arm projects up through the hub to the upper side thereof; the innermost cable layer (wound on the reel) will thus press this roller down and actuate switch 72 to a closed position. See FIG. 8. However, if the probe is accidentally lowered to such a point that this innermost layer of cable is nearly unwound from the reel, thereby uncovering the roller of switch 72, the actuating arm of this switch moves outwardly under the urging of its spring, thereby moving the switch to open position. This switch movement serves to deenergize the reel drive motor 19, as will be subsequently explained in more detail; in this way, a "down" limiting action is provided.

Figure 7:
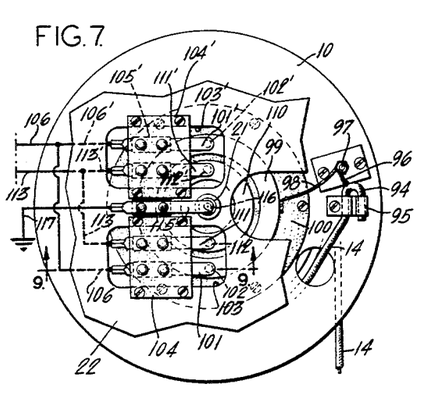
FIG. 7 is an end view of the reel, taken in the plane 7—7 of FIG. 5.
Figure 8:
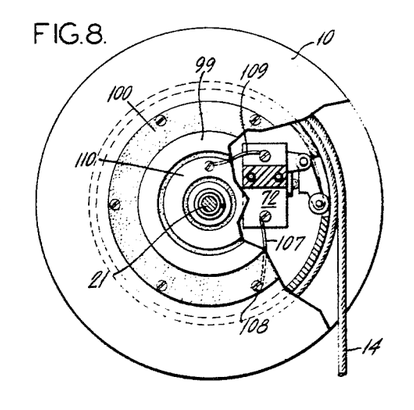
FIG. 8 is a view similar to FIG. 7, but taken in the plane 8—8 of FIG. 5.
Figure 9:
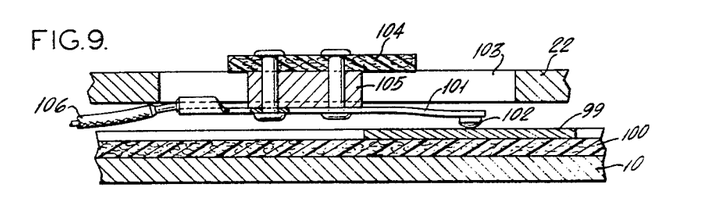
FIG. 9 is a partial section taken along line 9—9 of FIG. 7 and drawn on an enlarged scale.

The cable 14 is a coaxial cable with an armor shield, as disclosed in the aforementioned application, and has and O.D. slightly in excess of one-eighth inch (its actual O.D. may be about 0.135 inch, for example). Refer now to FIGS. 7–9. Electrical connections are made, in a manner now to be described, to the inner (i.e., upper) end of cable 14 (which is wound on reel 10). These connections are such as to allow the rotation of reel 10 while maintaining electrical continuity with items carried by the reel. At the end of reel 10 opposite to that at which the gears 49, 52, etc. are located, the upper end of cable 14 (i.e., the end thereof opposite to the end which is secured to probe assembly 13) is brought out through the end flange of the reel 10. At this end of the cable, the shield 94 of the cable is soldered to a metallic "ground" clamp 95 which is mounted on the metal end flange of reel 10 and is metallically connected thereto. At this same end of the cable, the insulated inner conductor 96 of the shielded coaxial cable is soldered to a binding screw 97 which is insulatingly mounted on the reel end flange, and a short lead 98 is soldered at one end to screw 97 and at its opposite end to an outer metal contact ring 99 which is mounted on the outside of the reel end flange but is insulated therefrom by means of a disc 100 of electrical insulating material which is positioned between ring 99 and the reel end flange. Ring 99 is concentric with reel shaft 21 (see FIG. 7).

A stationary resilient finger 101 has a contact button 102 at one end thereof which is adapted to ride on ring 99 to make continuous electrical contact therewith. Finger 101 extends parallel to the longer dimension of a rectangular opening 103 provided in mounting plate 22, but is shorter than this longer dimension; this finger is positioned within opening 103 (viewed from the end of the reel, as in FIG. 7), but between plate 22 and the end flange of reel 10 (viewed from the side of the reel, as in FIG. 9). Finger 101 is secured intermediate its ends to a plate 104 of electrical insulating material which spans opening 103 and is attached to the outer face of plate 22, beyond the edges of this opening. A spacer member 105 between plate 104 and finger 101 positions this finger properly with respect to plate 22, so that button 102 can ride on ring 99, as the latter rotates with reel 10.

An electrical lead 106 is connected to the end of finger 101 opposite to button 102 (i.e., to the left end of the finger in FIG. 7), and this "cable" lead is one of the leads that are led out of housing 9 into housing 33, and thence to the readout chassis 16 through seal 93.

At a location diametrically opposite (referred to the axis of shaft 21) to elements 101 through 106, these latter elements are duplicated, the duplicated elements being referred to by the same reference numerals but carrying prime designations. Contact button 102' (carried by finger 101') also rides on ring 99, and the lead 106' (connected to finger 101') is connected directly to lead 106. Thus, buttons 102 and 102' are electrically paralleled, and they both make continuous electrical contact with the "cable" ring 99.

Two electrical leads are connected to switch 72; one lead 107 is connected to a "ground" screw 108 which is screwed into the adjacent metallic end flange of reel 10, and the other lead 109 is electrically connected to an inner metal contact ring 110 which is mounted on the outside of the reel end flange but is also insulated therefrom by disc 100, which is between ring 110 and the reel end flange. Ring 110 is concentric with reel shaft 21 and with ring 99, and is spaced radially inwardly from the latter.

A stationary resilient finger 111, similar and parallel to finger 101 (and, like finger 101, positioned within opening 103), has a contact button 112 at one end thereof which is adapted to ride on ring 110 to make continuous electrical contact therewith. Finger 111 is also secured, intermediate its ends, to plate 104, and has an unnumbered spacer member (between finger 111 and plate 104) like spacer 105, to position finger 111 so that button 112 can ride on ring 110, as the latter rotates with reel 101.

An electrical lead 113 is connected to the end of finger 111 opposite to button 112, and this "down limit switch" lead is one of the leads that are led out of housing 9 into housing 33, and thence to the readout unit 16.

At a location diametrically opposite to elements 111 through 113, these latter elements are duplicated, the duplicated elements being referred to by the same reference numerals but carrying prime designations. Finger 111' is located within opening 103' and is secured to plate 104'; its contact button 112' also rides on ring 110, and the lead 113' (connected to finger 111') is connected directly to lead 113. Thus, buttons 112 and 112' are electrically paralleled, and they both make continuous electrical contact with the "down limit swtich" ring 110.

A "ground" contact button 114 (see FIG. 4) is mounted in the end of shaft 21 adjacent rings 99 and 110. A stationary resilient finger 115 has a contact button 116 at one end thereof which engages button 114, to make continuous electrical contact with the latter as shaft 21 rotates. Finger 115 extends horizontally in FIG. 7, being parallel with fingers 101, 111, 101', and 111', and is located between openings 103 and 103' (and also between plates 104 and 104'). The intermediate portion of finger 115 is metallically secured to mounting plate 22, to provide an effective and continuous "ground" connection to the reel shaft 21 as well as to metallic structural components inside housing 9, in particular the mounting plates 22 and the metallic reel 10. An electrical lead 117 is connected to the end of finger 115 opposite to button 116, and this "ground" lead is one of the leads that are led out of housing 9 into housing 33 and thence to the readout chassis 16.

Figure 10:
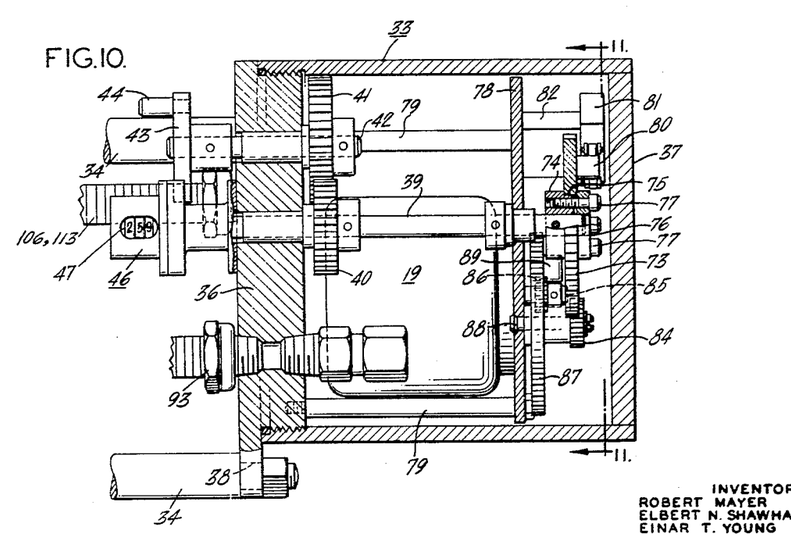
FIG. 10 is a vertical section through the drive motor housing, taken along line 10—10 of FIG. 3.
Figure 11:
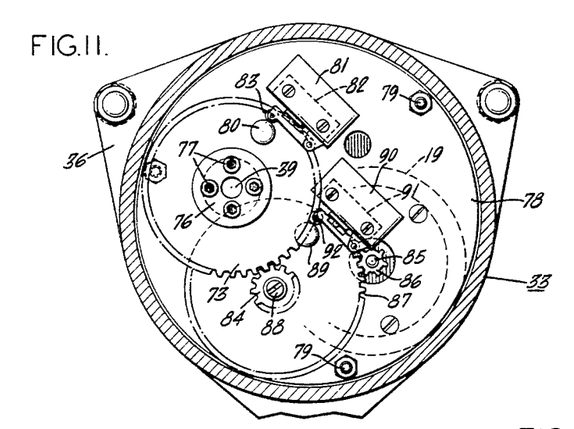
FIG. 11 is a vertical section taken along line 11—11 of FIG. 10.

Refer now to FIGS. 10 and 11. The gear 73 is adjustably mounted on indexing shaft 39, as previously stated. A collar 74 is pinned to shaft 39, and gear 73 is positioned in a circumferential notch 75 provided in the outer end of collar 74; gear 73 is capable of rotation in notch 75 for purposes of adjustment. Gear 73 is clamped in an adjusted angular position in notch 75 (so as to drive shaft 39) by means of a clamping plate 76 which bears against the outer face of gear 73 and forces this gear into tight engagement with the shoulder formed at the inner end of notch 75; plate 76 is tightened in position on collar 74 by means of four adjustment screws 77 (spaced 90° apart on a base circle concentric with the axis of shaft 39) which thread into respective tapped holes in collar 74 and bear against the outer face of plate 76. Thus, when the screws 77 are loosened, gear 73 may be manually adjusted angularly with respect to shaft 39; when these screws are tightened, gear 73 is rigidly clamped to shaft 39 so as to drive the same.

A switch-actuating pin 80 is rigidly secured to gear wheel 73 near the periphery thereof (but radially inwardly from its teeth), this pin extending outwardly from the gear wheel (i.e., to the right in FIG. 10). A single-pole, double-throw snap-action momentary-contact switch 81 is mounted on the outer side of plate 78 by means of a bracket 82, in such a position that the roller 83 at the free end of its pivoted actuating arm lies in the path of rotation of pin 80, as gear 73 rotates. The combination of pin 80 and switch 81 provides the same action as a cam-operated switch, in that when gear 73 reaches a certain angular position in its rotation, pin 80 comes into engagement with switch roller 83, resulting in the actuation of switch 81. Switch 81 is "normally closed," but is actuated by pin 80 to the open position. Since gear 73 is fixed directly to shaft 39, it rotates at the same speed as this shaft, the rate being such that one revolution of gear 73 (and of pin 80) corresponds to twelve inches of movement of probe assembly 13 (through the cable 14 which is wound on reel 10).

A switch-actuating pin 89 is rigidly secured to gear wheel 87 near the periphery thereof (but radially inwardly from its teeth), this pin extending outwardly from the gear wheel (i.e., to the right in FIG. 10). A single-pole, double-throw snap-action momentary-contact switch 90 is mounted on the outer side of plate 78 by means of a bracket 91, in such a position that the roller 92 at the free end of its pivoted actuating arm lies in the path of rotation of pin 89, as gear 87 rotates. The combination of pin 89 and switch 90 provides the same action as a cam-operated switch, in that when gear 87 reaches a certain angular position in its rotation, pin 89 comes into engagement with switch roller 92, resulting in the actuation of switch 90. Switch 90 is "normally closed," but is actuated by pin 89 to the open position. Gear 73 has ninety-six teeth and gear 84 (to which pin 89 is in effect secured, gears 84 and 87 being pinned together) has twenty-four teeth, so that gear 87 rotates at four times the rate of gear 73, the rate of rotation of gear 87 being such that four revolutions thereof (and of pin 89) correspond to twelve inches of movement of probe assembly 13 (through cable 14, wound on reel 10). In this connection, it will be recalled that each revolution of indexing shaft 39 causes a one-foot movement (up or down) of the probe assembly.

The two switches 81 and 90 are electrically paralleled (by means of leads, not shown in FIG. 11, but shown in the circuit diagram of FIG. 12), one side of both switches being connected to a "common" terminal of reel drive motor 19, and the other side of both switches being connected to a lead 20 which extends out of housing 33 to the readout chassis 16. A lead 20 (see FIG. 1) also extends from the aforesaid "common" terminal of motor 19 to the readout chassis (or capacitance measuring and control unit) 16.

As will be described further hereinafter, the reel drive motor 19 may be energized selectively, when and as desired, to lower the probe assembly 13 in continuous fashion toward the cavern floor F. This operation may be performed to make a "level adjustment," that is, to properly "zero" the counter or footage indicator 46 (and also a remote counter or footage indicator, to be described). In addition, the reel drive motor 19 may be selectively energized to raise the probe assembly 13, as and when desired (e.g., to raise it to the surface for maintenance purposes). The "level adjustment" procedure will now be described.

When the probe assembly 13 is connected to the capacitance measuring unit 16 (which unit includes a recorder, as will be described), assuming that the probe assembly 13 is moving toward the cavern floor F, then as the bottom sensor 15 touches the cavern floor and the probe assembly moves downward an additional quarter inch, a capacitance change will be noted on the recorder, as described in the aforementioned copending application, indicating that the probe has just touched floor F. When this capacitance change is noted, the motor 19 is deenergized to stop movement of the probe, and the reading of counter 46 is noted. Then, the reel drive motor is energized to raise the probe assembly a predetermined small distance, by reference to indicator 46 as the probe is being raised. Next, the reel drive is locked, by jamming or clamping gear 41 on shaft 42 to prevent unreeling of the cable, care being taken not to damage the teeth of gear 41.

Next, the adjustable gear 73 is properly positioned, by first loosening screws 77 and then rotating this gear (with respect to shaft 39) until the actuator pins 80 and 89 are in the positions illustrated in FIG. 11. In this connection, it may be noted that the gear wheel 87 (which carries pin 89) will rotate as gear 73 is manually rotated, due to the meshing of gears 73 and 84. After gear 73 is adjusted to the proper position, it is locked in this position by tightening the four adjustment screws 77. Following this, the counter 46 is reset (by its manual adjustment means) to a predetermined reading, the remote counter also being reset to this same reading. Finally, the reel drive locking device is removed.

The electrical leads connected to the components in drive motor housing 33 (e.g., the motor 19 and switches 81 and 90), together with leads connected to cable 14 and switches 67 and 72 (in housing 9), are led through the housing base 35 by means of a suitable conduit which passes through a pressure seal 93 (FIG. 2); all of these various leads are connected to the remote readout chassis 16, which will be further referred to hereinafter. The leads connected to the items in housing 9 are first lead out to housing 33 (as indicated at 106, 113) and thence to the chassis 16, through pressure seal 93.

Figure 12:
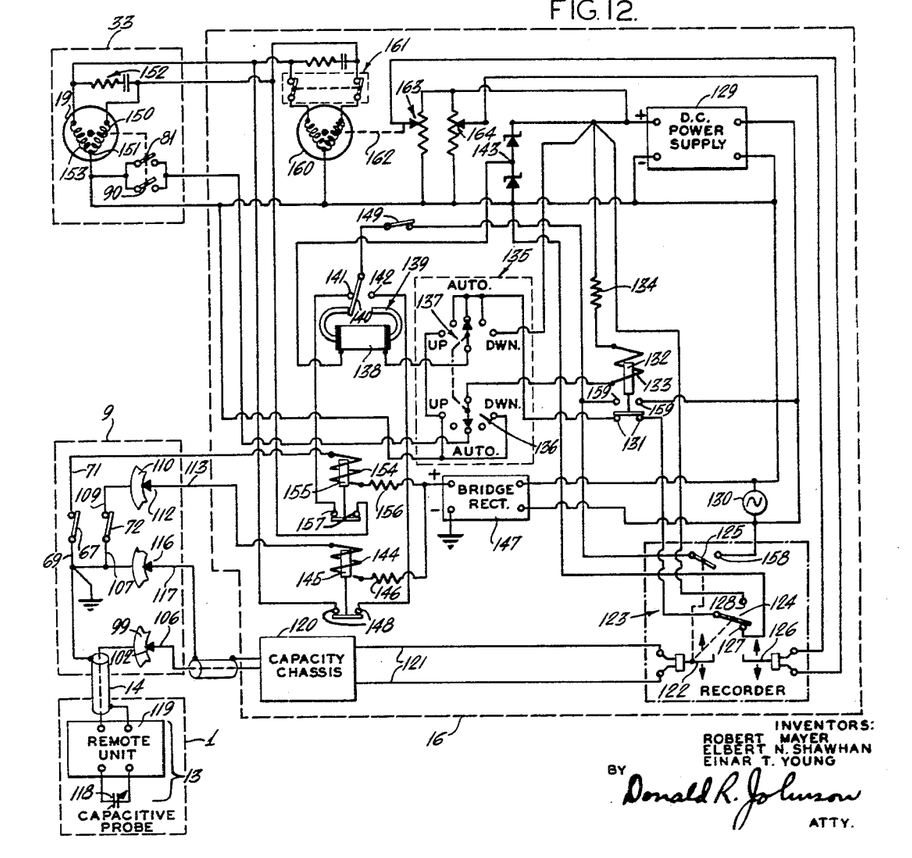
FIG. 12 is a circuit diagram illustrating the electrical circuitry utilized in the invention.

Refer now to FIG. 12. The probe assembly 13 is illustrated in the cavern 1, as it would be under "normal automatic" operating conditions, "normal automatic" referring to the measurement of liquid level in the cavern with automatic follow-up by the probe assembly of such liquid level. The probe assembly 13 includes a capacitive probe or sensor 118 and a remote unit 119 to which the probe 118 is connected. The probe or sensor 118 is preferably constructed as disclosed in the aforementioned copending application, and it is connected to unit 119 as disclosed in such application. The circuitry utilized in 119, for liquid-level-measurement purposes, is preferably substantially the same as that utilized in the "tank assembly" of Shawhan Patent No. 3,073,160, dated Jan. 15, 1963. The probe end of coaxial cable 14 is connected to remote unit 119, and this cable extends upwardly out of the cavern through gate valve 4, as previously described in connection with FIG. 1.

The cable 14 extends upwardly into housing 9 and thence through items 63, 61 and 59, as described hereinabove, onto reel 10. At the reel 10, the insulated inner conductor of the cable is connected through contact ring 99 and button 102 to lead 106, as previously described, while the (grounded) shield of the cable is connected through the button 116 (or through other metallic structural elements) to lead 105. Leads 106 and 117 extend from housing 9 through the housing 33 to the readout chassis 16, as previously described; for simplicity, these two leads are illustrated in FIG. 12 as embodied in a coaxial cable which extends directly from housing 9 to unit 16.

In unit 16, the "cable" leads 106 and 117 (or ground) are connected to the input of a capacity chassis 120, which produces across its output leads 121 a signal voltage proportional to the capacitance sensed by sensor 118, and hence proportional to the level of the liquid in cavern 1 (this assumes that the sensor 118 is in an appropriate "reading" position in the cavern). At this juncture, it may be noted that the capacity chassis 120 employs circuitry quite similar to that disclosed in the aforementioned Shawhan patent, this latter circuitry being the "local" apparatus, exclusive of the "tank assembly" of such patent.

The output signal voltage of capacity chassis 120 is fed to one pen 122 (for example, the "red" pen) of a two-pen recorder 123. As the liquid level in the cavern 1 varies, the effective capacitance of sensor 118 varies, resulting in variations of the output signal across leads 121, as described in detail in the aforementioned Shawhan patent. These output signal variations cause the recorder pen 122 to move with respect to the clockwise-driven chart of the recorder 123.

The recorder 123 is of a commercially-available type and includes two switches 124 and 125 which operate in conjunction with pen 122, and also includes a "blue" pen 126. Switch 124 is a single-pole, double-throw switch which is actuated in response to movements of the pen 122 and is always closed on either one or the other of its two fixed contacts 127 or 128, contact 127 being closed when pen 122 is on one side of approximately midscale and contact 128 being closed when pen 122 is on the opposite side of approximately midscale (midscale corresponding, of course, to 50% of scale). In FIG. 12, switch 124 is illustrated as closed on contact 127. Fixed contact 128 is connected to the positive terminal of a unidirectional power supply 129 which is energized from a conventional 115-volt alternating current source 130, while fixed contact 127 is connected to the negative terminal of power supply 129. In the illustrated position of switch 124, a negative voltage is applied to the movable contact of this switch, and this negative voltage is fed via such movable contact to one of the pair of contacts 131 of a relay 132. It should be apparent that when switch 124 reverses, closing contact 128, a positive voltage will be fed to this same one of the pair of contacts 131.

One end of the coil 133 of relay 132 is connected to the positive terminal of power supply 129 through a resistor 134, while the other end of this coil is connected through the intermediate or "auto" (for automatic) position, of the first section or pole 136 of a two-section, two-pole, five-position rotary switch 135 to one side of the paralleled cam-operated switches 81 and 90, the other side of these switches being connected to the negative terminal of power supply 129. Switches 81 and 90 are illustrated in FIGS. 9 and 12 in the open position, so that at this time coil 133 is not energized and contacts 131 are closed as illustrated. However, as soon as gear 87 (FIG. 9) begins to rotate when driven by motor 19, switch 90 closes to complete an energization circuit for coil 133, energizing relay 132 and opening contacts 131.

The other of the pair of contacts 131 is connected through the three intermediate or "auto" positions of the second section 137 of rotary switch 135 to the right-hand end of the coil 138 of a bistable or polarized relay 139 having a movable contact 140 which engages one 141 or the other 142 of a pair of fixed contacts. When coil 138 is energized with a voltage of a predetermined polarity (for example, such that the right-hand end of this coil is negative with respect to the left-hand end thereof), contact 140 is caused to engage contact 141, and this relay position will be maintained even when the energizing voltage is removed, until a voltage of the opposite polarity is applied to coil 138, at which time contact 140 will be brought into engagement with contact 142; this latter position will be maintained until the first-mentioned (negative) polarity voltage is again applied to coil 138. The left-hand end of coil 138 is connected to an intermediate point 143 on power supply 129, so that the right-hand end of this coil may be made either positive (via contact 128 of switch 124) or negative (via contact 127 of switch 124) with respect to this left-hand end. Thus (as long as contacts 131 are closed), when switch 124 reverses, relay 139 reverses.

Under "normal automatic" operating conditions, member 63 has the position illustrated in FIG. 3, so that the "up" limit switch 67 is closed. Thus, a circuit is completed from the "grounded" switch lead 69, through closed switch 67, switch lead 71, the coil 154 of a relay 155, and a resistor 156, to the positive terminal of a bridge rectifier 147 which is energized from the alternating current source 130. The negative terminal of rectifier 147 is grounded. Relay 155 is therefore energized, closing its contacts 157. Then, a circuit is completed as follows (when contact 140 of relay 139 is in engagement with contact 141, as illustrated): movable contact of recorder switch 125, a (normally closed) single-pole, single-throw "emergency stop" switch 149, contacts 140 and 141 of relay 139, closed contacts 157 of relay 155, one winding 150 of reel drive motor 19, and the common terminal 151 of motor 19, to the "neutral" terminal of alternating current source 130. A paralleled portion of this circuit includes in series the resistor-capacitor combination 152 and the other winding 153 of motor 19.

Under "normal automatic" conditions, there are a sufficient number of turns of cable 14 in the innermost layer on reel 10 to actuate the "down" limit switch 72 to closed position. Thus, a circuit is completed from the "grounded" switch lead 107, through closed switch 72, switch lead 109, contact ring 110, button 112, lead 113, the coil 144 of a relay 145, and a resistor 146, to the positive terminal of rectifier 147. Relay 145 is therefore energized, closing its contacts 148. When relay 139 reverses (as a result of the closing of switch 124 on contact 128) to close movable contact 140 on fixed contact 142, a circuit is completed as follows: movable contact of recorder switch 125, the normally-closed switch 149, contacts 140 and 142 of relay 139, closed contacts 148 of relay 145, winding 153 of motor 19, and terminal 151 of motor 19, to the "neutral' terminal of source 130. A paralleled portion of this circuit includes in series the RC combination 152 and motor winding 150.

The reel drive motor 19 is a reversible pulse-type motor which is provided with a magnetic detenting arrangement; such a motor stops within a half-cycle of the alternating current (here 60 c.p.s.), after the energizing voltage is removed. The motor has two windings 150 and 153 one end of each of which are commoned at 151. For purposes of discussion, the winding 150 may be termed the "up" winding and the winding 153 the "down" winding. Thus, when winding 150 is energized directly and winding 153 is energized through the RC combination 152, the motor 19 rotates in such a direction as to reel in the cable 14 (by driving reel 10 in the "wind-up" direction); when winding 153 is energized directly and winding 150 is energized through the RC combination 152, the motor 19 rotates in such a direction as to reel out the cable 14 (by driving reel 10 in the "unwind" direction).

The switch 125 in recorder 123 is a single-pole, single-throw switch which is actuated in response to movements of pen 122; switch 125 is open between 10 and 90% of scale, and is closed from 0 to 10% and from 90 to 100% of scale. When switch 125 is closed on its fixed contact 158, the movable contact of this switch is connected to the "hot" terminal of alternating current source 130. This completes an energization circuit for reel drive motor 19 (through circuits previously described), the particular sense of energization of this motor (and, consequently, the direction of rotation thereof) depending upon the position of relay 139 (the position of this latter relay depending in turn upon the position of switch 124). Thus, when the position of relay 139 is as illustrated, the closure of switch 125 results in the energization of motor winding 150 (from source 130) directly, and motor 19 rotates in the "up" direction. When relay 139 is reversed from the position illustrated (as a result of the reversal of switch 124), the closure of switch 125 results in the energization of motor winding 143 directly, and motor 19 rotates in the "down" direction.

Relay 132 has a pair of contacts 159 which are connected directly across switch 125, and which are closed when relay 132 is energized. Thus, when relay 132 is energized, contacts 159 close to bypass switch 125 and maintain the energization circuit to motor 19, even though switch 125 opens in response to movement of pen 122 to within the 10–90% range of scale.

The operation of the follow-up or drive circuitry for the probe assembly, under "normal automatic" operating conditions, will now be described. Assume that the "red" pen 122 is on the "up" side of midscale on the recorder 123, representing a need for driving the probe assembly "up." Switch 124 then has the position illustrated, resulting in an actuation of relay 139 to the position illustrated.

Now, when the pen 122 moves beyond the 90% point on the chart of recorder 123, switch 125 closes. This completes an energization circuit to the "up" winding 150 of motor 19, as previously described, and this motor begins to rotate in the appropriate direction to cause reeling in of the cable 14 onto reel 10. This causes the probe assembly 13 to move upwardly in cavern 1.

As the "fine" gear 87 (FIG. 9) begins to rotate, pin 89 moves away from roller 92, causing switch 90 to move to the closed position. Rotation of "coarse" gear 73 at this time is also moving pin 80 away from roller 83, but since gear 87 is moving at a faster rate than gear 73, switch 90 will close before switch 81.

The closing of switch 90 completes an energization circuit for relay 132 through resistor 134 and section 136 of switch 135, opening its contacts 131 and closing its contacts 159. The opening of contacts 131, which are in series with the coil of relay 139, prevents premature reversal of this relay and thus allows the incremental follow-up cycle to be completed, even though switch 124 may reverse, as a result of movement of pen 122, during the cycle. In this connection, it may be noted that pen 122 will move downwardly on the recorder chart as the probe assembly 13 moves upwardly in the cavern, due to the relative change of liquid level on the probe 118. The closing of contacts 159 "shorts out" switch 125, thus allowing the follow-up cycle to be completed, even though switch 125 opens as a result of movement of pen 122 below 90% scale during such cycle.

It has previously been stated that the "fine" gear 87 rotates through four revolutions during a single incremental follow-up cycle. During each such revolution of gear 87, pin 89 comes into engagement with roller 92, resulting in the opening of switch 90. However, once the follow-up cycle has begun, this opening of switch 90 has no effect, since pin 80 has moved away from roller 83 and the parallel-connected switch 81 is then closed, maintaining relay 132 energized.

The rotation of the indexing drive shaft 39 through precisely one revolution is effected by means of the "coarse" and "fine" switches 81 and 90, respectively. When shaft 39 (and gear 73) has rotated through approximately one revolution, pin 80 comes into engagement with roller 83, opening "coarse" switch 81; at this time, pin 89 is very close to the position wherein it causes "fine" switch 90 to open. Due to the parallel connection of switches 81 and 90, it is necessary for both of these switches to open before the cycle will terminate. Precise termination of the cycle is made when pin 89 causes switch 90 to open (switch 81 being at this time still actuated to open position by pin 80). When switches 81 and 90 are both returned to their open positions as described, shaft 39 has rotated through precisely one revolution.

When switches 81 and 90 both reopen, relay 132 is deenergized to reopen its contacts 159 and reclose its contacts 131. The reopening of contacts 159 breaks the energization circuit for motor 19 (switch 125 having already reopened, as previously described), so that this motor immediately stops. The reclosing of contacts 131 completes the circuit between switch 124 and relay 139, so that the latter again comes under the control of recorder switch 124 (as necessary for succeeding follow-up cycles).

It is desired to be pointed out at this juncture that during "normal automatic" operating conditions, rotary switch 135 is in its "auto" position, and "emergency stop" switch 149 is closed; if any emergency occurs, the latter may be opened to break the circuit to motor 19 and thus stop this motor. In this connection, it is noted that the readout chassis 16 is located at the surface, so that the manually-operated switches 135, 149, etc. are easily accessible.

If the "red" pen 122 is on the "down" side of midscale, representing a need for driving the probe "down," switch 124 will be on contact 128, and relay 139 will therefore be actuated to its other position, wherein contact 140 engages contact 142. Then, when the pen 122 moves below the 10% point on the recorder chart, switch 125 will close, which will complete an energization circuit to the "down" winding 153 of motor 19. The motor will then rotate in the opposite direction to pay out the cable from reel 10, lowering the probe assembly 13 in the cavern.

The cam-operated switches 81 and 90 will then be operated in the same manner as before, the only difference being that gears 87 and 73 will rotate in directions opposite to their previous directions of rotation. Relay 132 will be energized as before, by the closing of switch 90.

The rotation of shaft 39 through precisely one revolution will again be effected by means of switches 81 and 90, operating in the same manner as before, the opening of both of these switches causing deenergization of relay 132.

It has just been described how the indexing drive shaft 39 is rotated in increments of precisely one revolution. As previously described, when shaft 39 rotates through one revolution, shaft 42 rotates two-thirds of a revolution, which causes exactly one foot of cable to be moved onto or off reel 10. Thus, each incremental follow-up cycle causes the probe assembly to be raised or lowered exactly one foot.

The active or "measuring" length of the probe 118 is preferably thirty inches, and (as previously described) the level of the liquid on this probe is determined by measuring the capacitance of the probe and converting it to liquid level (by means of capacity chassis 120 and recorder pen 122). When the level of the liquid is more than one foot from the center of the length of the probe (resulting in the recorder "red" pen 122 moving below 10% or above 90% of scale), the switch 125 is closed as described, resulting in the automatic raising or lowering of the probe in a one-foot step, exactly, thereby moving the probe to a new position such that the liquid level is substantially at the center of the length of the probe. The capacitance of the probe is converted to liquid level and is recorded by the "red" pen 122 on the recorder chart, in feet and inches. This latter indication represents the level of the liquid on the probe.

A counter motor 160, of the same type as motor 19, is provided on the readout chassis 16. Motor 160 is connected electrically in parallel with motor 19, so that the former is energized along with the latter, and in the same sense. Therefore, the rotation of motor 160 is synchronized with the rotation of motor 19. The electrical connections to motor 160 are taken through a double-pole, single-throw "normal-off" switch 161 which is closed to motor 160 in the "normal" position and which opens the connections to this motor in the "off" position. Switch 161 is in its "normal" position during "normal automatic" operation, but may be manually turned "off" when desired, to deenergize motor 160.

The motor 160 drives a mechanical counter (not shown) which may be similar to counter 46, but in the "remote" counter (driven by motor 160) the tenths wheel is not masked off.

The motor 160 also drives, through a suitable mechanical connection schematically indicated at 162, the movbale contact on a ten-turn potentiometer 163 which is connected across the power supply 129. A manually-adjustable potentiometer 164 is connected in parallel with potentiometer 163, across power supply 129. The voltage between the movable contacts of potentiometers 163 and 164 is fed to the "blue" pen 126 of recorder 123, and this voltage is thereby recorded as "feet" on the recorder chart.

The mechanical motion of the probe assembly 13 is indicated at the readout chassis 16 by the counter which is driven by motor 160 and by the "blue" pen 126. The counter which is driven by motor 160 is read in feet (although the tenths of foot wheel of this counter is also visible) and indicates the position of the probe assembly 13 in the cavern, with respect to the bottom of the cavern immediately below the probe.

The liquid level measuring apparatus of this invention is calibrated in feet and inches, from the bottom of the cavern 1 immediately below the probe 118. In using the apparatus of this invention for measuring liquid level, the cavern liquid level is the sum of two measurements, namely the reading in feet of the counter driven by motor 160 (which indicates the position of the probe in the cavern), and the reading in feet and inches of the "red" pen 122 (which indicates the level of the liquid on the probe). The reading of the "blue" recorder pen 126 is a duplication of that of the counter driven by motor 160, but since the "blue" pen may not read exactly on a line of the chart, there is less chance of error when the counter is read.

It has been explained hereinabove (referring to FIG. 4, elements 73, 77, etc.) how a "level adjustment" or "zero adjustment" is made. During this procedure, the "remote" counter (driven by motor 160) is reset when counter 46 is reset. The "remote" counter may be reset by slipping a large gear (not shown) which is on the potentiometer 163 behind this "remote" counter.

The counter 46 on the reel housing 33 is mechanically connected to the reel or drum 10 on which the cable 14 is wound, whereas the "remote" counter (on chassis 16) is driven by motor 160, which is powered simultaneously with the reel drive motor 19. Therefore, it is possible for this "remote" counter to become out of synchronism with counter 46. Thus, when these two counters do not quite agree, the "remote" counter will ordinarily be reset (in the manner described in the preceding paragraph) to agree with counter 46.

For lowering the probe assembly to the bottom of the cavern (for "level adjustment" or "zero adjustment" purposes), the switch 135 is moved to the "dwn" (for "down") position. Through section 137 of switch 135, a positive voltage is then applied to the right-hand end of coil 138, reversing relay 139 from the position shown, so that contact 140 engages contact 142. Through section 136 of switch 135, the lower end of coil 133 is connected directly to the negative terminal of power supply 129, and since the upper end of this coil is connected through resistor 134 to the positive terminal of this same power supply, relay 132 is energized, closing its contacts 159 and opening its contacts 131. Relay 132 is, under these conditions, energized independently of the cam-operated switches 81 and 90, so that the opening of these switches, as reel drive motor 19 rotates, has no effect on relay 132.

The closing of relay contacts 159 completes an energization circuit for the "down" winding 153 of motor 19, as follows: "hot" terminal of alternating current source 130, closed contacts 159, closed switch 149, contacts 140 and 142 of relay 139, closed contacts 148 of relay 145, motor winding 153; the other end of winding 153 is of course connected at 151 to the "neutral" terminal of the source 130. Motor 19 then rotates in the "down" direction, such as to pay out or unwind the cable 14 from reel 10. This moves the probe assembly 13 toward the bottom of the cavern.

Before this downward travel of the probe (for "zero adjustment" purposes) is initiated, the "zero adjustment" resistor provided on the capacity chassis 120 (and described in the aforementioned Patent No. 3,073,160) is varied in value by a fixed increment, to provide a "zero offset" of the recorder pen 122, such that it will be between one and two feet on the recorder chart; if this offset were not provided, the "red" pen 122 would be at full-scale or 100% value, since under these conditions the space between the capacitive electrodes of the probe is completely filled with the cavern liquid. For convenience, a switch may be provided which "shorts out" a portion of the "zero adjustment" resistor to effect a "zero offset."

The "grounded" bottom sensor 15 (whose construction is described in detail in the aforementioned copending application) has a large or magnified capacitance-varying effect on the probe, due to its close spacing to the inner or "ungrounded" electrode of the probe. Thus (as previously stated), during the movement of the probe assembly 13 toward the bottom of the cavern, the "red" pen 122 will be between one and two feet on the recorder chart; it will increase in reading about six inches as the probe touches bottom and moves an additional quarter inch. This increase in reading is of course the result of the action of the bottom sensor 15. As soon as the pen starts to move, indicating that the probe has touched bottom, the "emergency stop" switch 149 is opened, which opens the circuit to the motor, so that it then stops.

If for any reason the motor 19 is not stopped in time, the complete unreeling of the cable from reel 10 (with its disastrous consequences) is prevented by the action of the "down" limit switch 72. When the innermost layer of cable is almost (but not completely) unwound from reel 10, the roller of switch 72 is uncovered, allowing this switch to move to its open position. When this happens, the energization circuit for relay 145 is opened, deenergizing this relay so that its contacts 148 open. The opening of these contacts breaks the circuit to motor 19, so that it then stops.

For resuming automatic operation after the level adjustment procedure is completed, switch 135 is moved to the "auto" position. Movement of section 136 of this switch toward the "auto" position first breaks the energization circuit of relay 132, and thereafter returns this relay to the control of the cam-operated switches 81 and 90. In the upper section 137, the intermediate switch position (between "dwn" and "auto") connects the coil 138 of relay 139 into circuit with switch 124 (via relay contacts 131, which are closed by deenergization of relay 132 at this time) before relay coil 133 is connected into circuit with switches 81 and 90.

If it is necessary to close the valve 4 on the top of the cavern for any purpose (such, for example, as for performing a maintenance operation on the probe assembly 13), it is necessary to pull the probe assembly completely up through the casing string 3 and into the upper pipe 6, between valve 4 and housing 9. Prior to starting the probe up toward the reel housing 9, the "off-normal" switch 161 would be operated to the "off" position to open the connections to counter motor 160, in case the counter driven by this motor has (for convenience) been designed for only a limited range of travel.

In order to pull the probe up, the switch 135 is moved to the "up" position. Through section 137 of switch 135, a negative voltage is then applied to the right-hand end of coil 138, which will result in relay 139 being in the position illustrated (contact 140 in engagement with contact 141). Through section 136 of switch 135, the lower end of coil 133 is again (just as for the "down" operation, previously described) connected directly to the negative terminal of power supply 129, resulting in the energization of relay 132, as before. Again, relay 132 is energized independently of the cam-operated switches 81 and 90.

The closing of contacts 159 of relay 132 completes an energization circuit for the "up" winding 150 of motor 19, as follows: "hot" terminal of alternating current source 130, closed contacts 159, closed switch 149, contacts 140 and 141 of relay 139, closed contacts 157 of relay 155, motor winding 150; the other end of winding 150 is of course connected at 151 to the "neutral" terminal of source 130. Motor 19 then rotates in the "up" direction, such as to reel in or wind the cable 14 onto reel 10. This moves the probe assembly 13 toward the top of the cavern. By way of example, the probe assembly may be moved upward at the rate of approximately three feet per minute; in a typical cavern, the time for retraction of the probe may be about eighty-five minutes.

When the probe assembly is fully retracted (that is, drawn upwardly out of the cavern to the surface), its upper end comes into engagement with member 63, resulting in the actuation of the "up" limit switch 67 to the open position. When this happens, the energization circuit for relay 155 is opened, deenergizing this relay so that its contacts 157 open. The opening of these contacts breaks the circuit to motor 19, so that it then stops.

The switch 135 may be operated to the "down" position to return the probe to the cavern, after the desired maintainance has been completed. The "down" operation has previously been described. Movement of section 136 of switch 135 toward the "auto" or "down" positions first breaks the energization circuit of relay 132, and thereafter returns this relay to the control of the cam-operated switches 81 and 90 (when the switch 135 is in the "auto" position). In the upper section 137 of switch 135, the intermediate switch position (between "up" and "auto") connects the coil 138 of relay 139 into circuit with switch 124 (via relay contacts 131, which are closed by deenergization of relay 132 at this time) before relay coil 133 is connected into circuit with switches 81 and 90.

The invention claimed is:

1. In apparatus for determining the level of the upper surface of a body of liquid in a reservoir, an elongated liquid level responsive probe adapted to be suspended in said liquid body, a housing located above said reservoir and in communication therewith, a flexible cable attached at one end to said probe and extending upwardly therefrom into said housing, a cylindrical cable reel in said housing constructed and arranged for the winding of said cable thereon, the breadth of said reel being large compared to the diameter of said cable; a controllable electric motor for driving said reel, said motor being located outside said housing and being coupled to said reel inside said housing by way of a sealed coupling; means driven by said motor for guiding said cable to effect an orderly winding thereof onto said reel, detecting means coupled by way of said cable to said probe, said detecting means providing an output signal a characteristic of which varies as the upper surface of said body moves along the length of said probe; and means responsive to a predetermined variation in said output signal for controlling said reel driving motor.

2. Combination of claim 1, wherein said probe is a capacitive probe, and wherein said detecting means provides an output signal which varies in amplitude as the upper surface of said body moves along the length of said probe.

3. Combination of claim 1, wherein said detecting means provides an output signal which varies in amplitude as the upper surface of said body moves along the length of said probe, and wherein said responsive means is responsive to a predetermined amplitude variation in the output signal, with respect to and on either side of a mean output signal amplitude.

4. Combination set forth in claim 3, wherein said reel driving motor is selectively operable to cause either reeling in or paying out of said cable, and wherein said responsive means so controls the reel driving motor as to cause it to produce movement of the probe in the direction to reduce said predetermined output signal amplitude variation.

5. Combination in accordance with claim 1, characterized in that said responsive means, in response to a movement of the upper surface of said body to a plane spaced a predetermined distance away from the center of the length of said probe, so controls said reel driving motor as to cause it to produce movement of the probe to a new position wherein the center of its length is substantially coplanar with said body upper surface.

References Cited

UNITED STATES PATENTS

| | | |
|---|---|---|
| 2,682,026 | 6/1954 | Mesh et al. |
| 2,683,371 | 7/1954 | Droin et al. |
| 2,691,223 | 10/1954 | Oberlin. |
| 3,049,920 | 8/1962 | Allen _____________ 73—291 |
| 3,128,557 | 4/1964 | Childs _____________ 33—126.6 |
| 3,148,542 | 9/1964 | Clift _____________ 33—126.6 |

S. CLEMENT SWISHER, Primary Examiner

U.S. Cl. X.R.

33—126.6